March 26, 1968
M. C. HAYDEN
3,374,949
RELIGIOUS ROSARIES
Filed Nov. 23, 1966
4 Sheets-Sheet 1
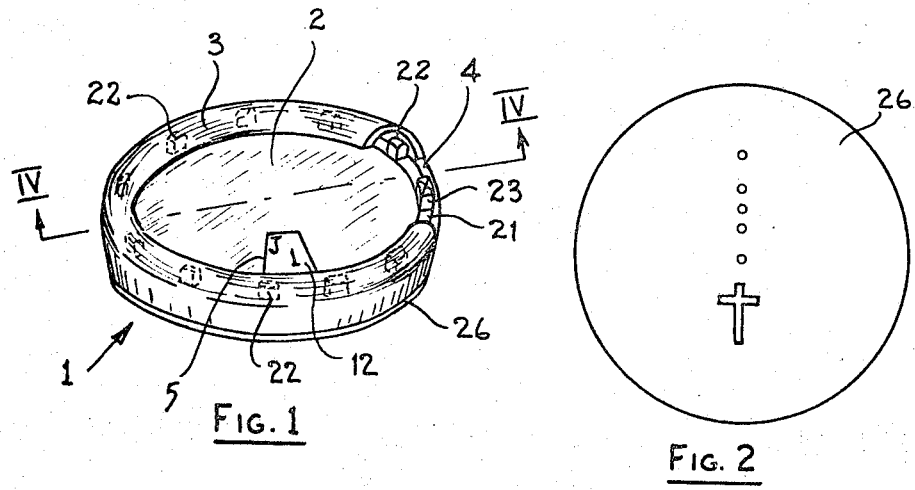
FIG. 1
FIG. 2
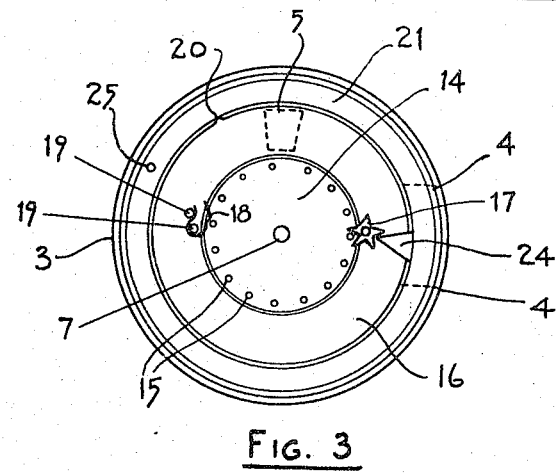
FIG. 3
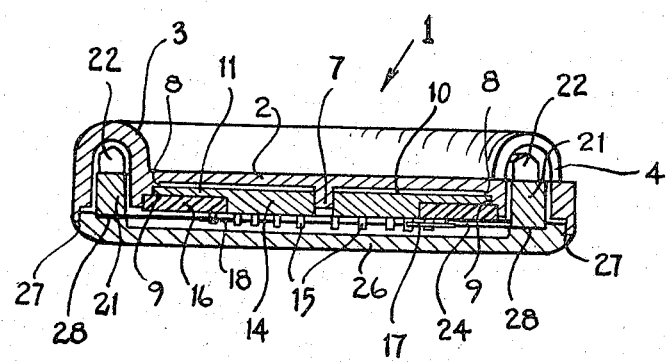
FIG. 4
Inventor
MARTIN CECIL HAYDEN
By McSteward Toren
Attorneys

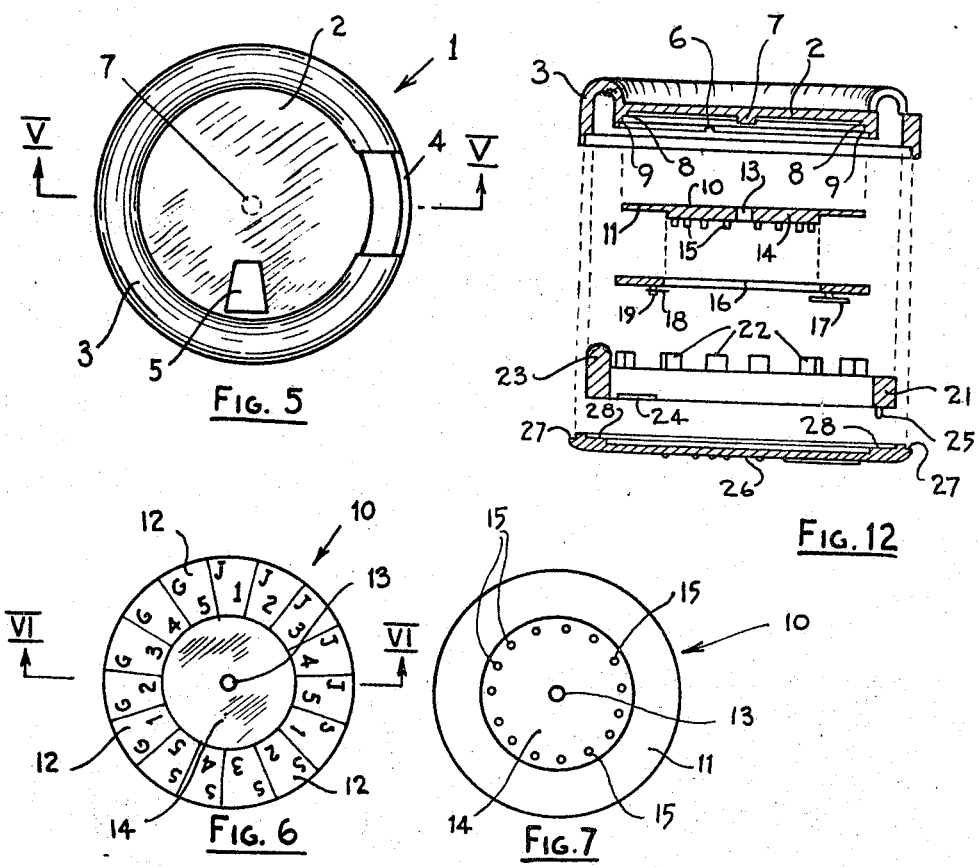

March 26, 1968   M. C. HAYDEN   3,374,949
RELIGIOUS ROSARIES

Filed Nov. 23, 1966   4 Sheets-Sheet 3

Inventor
MARTIN CECIL HAYDEN
By McGlew & Toren
Attorney

March 26, 1968

M. C. HAYDEN 3,374,949

RELIGIOUS ROSARIES

Filed Nov. 23, 1966

Inventor
MARTIN CECIL HAYDEN

By McGlew & Toren
Attorneys

United States Patent Office 3,374,949
Patented Mar. 26, 1968

3,374,949
RELIGIOUS ROSARIES
Martin Cecil Hayden, Loyola, 41 St. Assam's Ave.,
Raheny, Dublin, Ireland
Filed Nov. 23, 1966, Ser. No. 596,607
4 Claims. (Cl. 235—123)

ABSTRACT OF THE DISCLOSURE

A ring-type rosary composed of a rotatable bead ring disposed within a casing with a portion of the casing slotted for manually moving the bead ring. A picture wheel having a plurality of separate radially extending sectors is positioned within the casing, and each time the bead ring completes one revolution, ratchet means within the casing move the picture wheel a predetermined angular distance. The casing has a transparent window in register with one of the sectors on the picture wheel for displaying the material depicted in the sectors.

Summary of the invention

This invention relates to religious rosaries of the ring type in which the periphery of the ring is provided with eleven beads or protuberances by means of which account is kept of the utterance of the Paternoster and the ten Aves constituting one decade of the rosary prayer.

Heretofore the ring rosary provided only a means of keeping account of a single decade and did not provide a record of the number of decades uttered. Moreover, in the event of unavoidable interruption during recital of the rosary prayer, the hitherto known ring rosary does not provide any record of the stage of the rosary prayer reached when the interruption occurred for continuing the prayer after the interruption ceased, it being understood that the ring rosary finds its greatest use in circumstances when interruption could readily be experienced.

It is the object of the present invention to provide a religious rosary of the ring type which will not only overcome these shortcomings, but will also provide devotional aid in the form of religious representations depicted in pictorial and/or symbolic form, which preferably will comprise a representation of the particular mystery to which any particular decade of the rosary is being devoted.

The invention will be more clearly understood from the following description of alternative embodiments thereof given by way of example only with reference to the accompanying drawings in which, FIG. 1 is a perspective view of the ring rosary in assembled form ready for use.

FIG. 2 is a plan view from the underneath of FIG. 1.

FIG. 3 is a view similar to FIG. 2 but with the back cover of the assembly removed.

FIG. 4 is a cross-sectional view of the assembly taken on the line IV—IV of FIG. 1.

FIG. 5 is a plan view of the front cover of the assembly.

FIG. 6 is a plan view of the front side of a picture wheel component of the assembly.

FIG. 7 is a plan view from the back of FIG. 6.

FIG. 12 is an expanded assembly view in cross-section of the components taken on the lines V—V, VI—VI, VIII—VIII, X—X, and XI—XI of FIGS. 5, 6, 8, 10 and 11 respectively.

Figure 8:
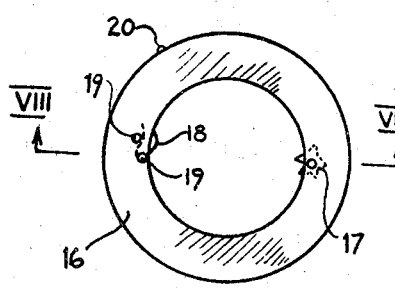
FIG. 8 is a plan view of the front side of a ratchet carrier ring component of the assembly.
Figure 9:
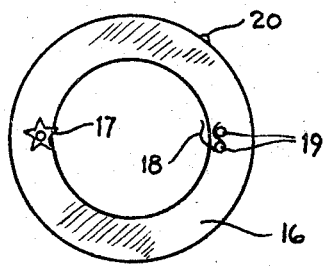
FIG. 9 is a plan view from the back of FIG. 8.
Figure 10:
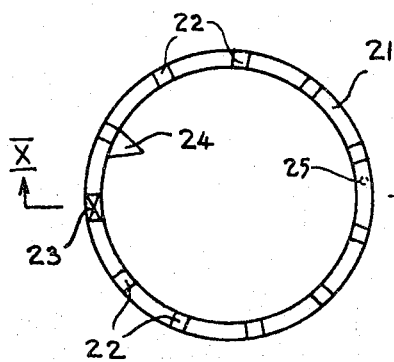
FIG. 10 is a plan view of the front side of a bead ring component of the assembly.
Figure 11:
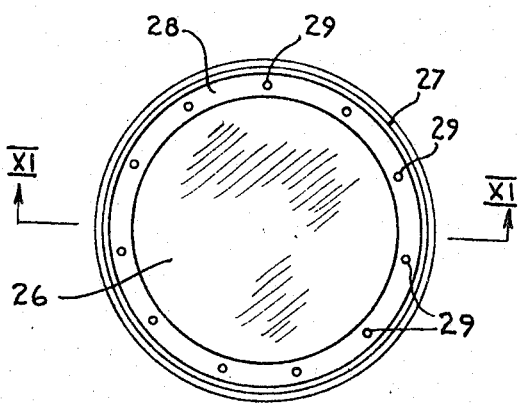
FIG. 11 is a plan view of the front side of the back cover component of the assembly.
Figure 14:
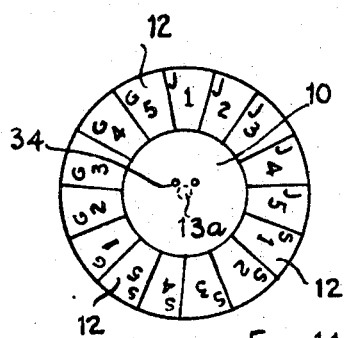
FIG. 14 is a plan view of the front side of the picture wheel component.
Figure 15:
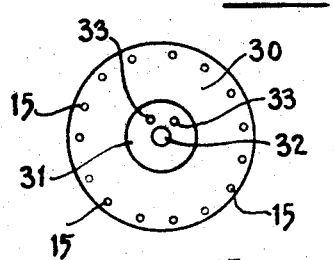
FIG. 15 is a plan view of the ratchet spoke disc.

The embodiment of the invention illustrated in FIGS. 1 to 12 of the accompanying drawings is conveniently constructed from the assembly of five separate components on a supporting member which, conveniently, takes the form of an enclosing casing, namely a front circular cover 1, a picture wheel 10, a ratchet carrier ring 16, a bead ring 21, and a back cover 26.

The front circular cover 1 (see FIGS. 1, 4, 5 and 12), which may be of any suitable material, is conveniently moulded in transparent thermo-plastic material, having a central recessed flat or domed portion 2 rendered opaque such as by the application of a paint thereto, and a peripheral transparent upstanding flange 3 of substantially reversed U-section, portion 4 of which is cut away to the level of the central portion 2, the central portion 1 having a window 5 formed therein adjoining the flange 3, such transparent window 5 being provided by leaving the window 5 of the central portion 2 unpainted. The bottom edge of the outer limb of the peripheral flange 3 is provided with a recess 6 (see FIGURE 12) for a purpose hereinafter explained, and the central portion 2 is provided with a downwardly projecting stub spindle 7. The underneath surface of the central flat portion 2 is provided with a stepped pair of peripherally recessed seatings 8 and 9 for the positioning thereon of other components of the assembly as hereinafter explained.

The picture wheel 10 (see FIGS. 4, 6, 7 and 12) comprises a disc, which may conveniently be of metal, an annular peripheral portion 11 of which is divided into fifteen equal radial sections 12 on the front side of the wheel which have applied thereto pictorial religious representations, such as the fifteen different mysteries recited in a complete rosary of fifteen decades. Alternatively the sections 12 may have symbolic markings applied thereto such as shown in FIG. 6 to identify each of the fifteen mysteries. The wheel 10 has a central hole 13 therein by which it is rotatably mounted on the stub spindle 7, the extreme periphery of the wheel 10 seating on the peripheral stepped recess 8.

The back of wheel 10 has a central boss portion 14 of greater thickness than the annular portion 11, said boss portion 14 having fifteen uniformly spaced ratchet spokes 15 projecting from the back of the boss 14 at its peripheral edge.

The window 5 is situated in the front cover 1 so that the pictures or symbolic markings on the radial sections 12 are successively displayed through the window 5 as the picture wheel 10 is intermittently rotated.

The ratchet carrier ring 16 (see FIGS. 3, 4, 8, 9 and 12) comprises a flat annular disc, preferably of metal having a ratchet wheel 17 rotatably mounted near its inner peripheral edge and also a U-spring 18 fitted to anchor pins 19. The ring 16 is located in the annular peripheral portion 11 of the picture wheel 10, in which position (see FIG. 3) the ratchet wheel 17 engages with the ratchet spokes 15 for intermittent rotation of the picture wheel 10, the spring 18 bearing on the spokes 15 to act as a resilient stop member limiting each intermittent rotation to one-fifteenth of a complete revolution. The ring 16 is provided with a peripheral stub projection 20 (see FIGS. 8 and 9) which is engaged with the recess 6 in the flange 3 of the front cover 1 whereby the ring 16 is restrained from any rotation relative to the front cover.

The bead ring 21 (see FIGS. 1, 3, 4, 10 and 12) may be of metal and is provided with ten Ave beads 22 and one Paternoster bead 23 projecting from the front peripheral face of the ring 21, all eleven beads being at uniform peripheral spacing from each other, and the Paternoster bead 23 being made larger than the other ten Ave beads 22, or otherwise adapted so as to be readily distinguishable by touch from the Ave beads 22.

The back face of the bead ring 21 is provided with a pawl tongue 24 extending inwardly in the radial direction. The back face of the bead ring 21 is also preferably provided with an outwardly spring pressed plunger 25 (see FIGS. 3 and 12) for a purpose to be hereinafter described.

The bead ring 21 is rotatably positioned in the assembly so as to occupy the interior of the inverted U-shaped flange 3 of the front cover 1 (see FIGS. 1 and 4), the back face of the bead ring 21 being approximately flush with the back faces of the ratchet carrier ring 16 and the picture wheel boss 14.

The back cover 26 (see FIGS. 1, 2, 4, 11 and 12) may be conveniently moulded in decorative thermo-plastic material in disc form having a recessed peripheral edge 27 for snap-on engagement with the interior of the outer limb of the inverted U-shaped flange 3 of the front cover 1. The interior face of the back cover 26 is provided with a peripheral track 28 for supporting the rotatable bead ring 21 (see FIGS. 4 and 12), said track 28 having eleven uniformly spaced holes 29 formed along the centre line thereof with which the spring pressed plunger 25 fitted to the back face of the bead ring 21 is adapted to engage successively as the bead ring 21 is intermittently rotated during recital of the rosary. In this manner the extent of peripheral movement of each bead necessary during recital of the rosary, namely one-eleventh of a complete revolution, is clearly indicated as the plunger 25 snaps into each of the holes 29 successively.

The exterior face of the back cover 26 is preferably provided as shown in FIG. 2 with a representation of the crucifix and with the customary five initial beads of a rosary for the recital of the initial Paternoster, three Aves and the Gloria Patri. Additional depicted devotional aid may, of course, be provided on the exterior of the back cover 26.

In use, the bead ring 21 is rotated by the thumb until the pictorial or symbolic representation of the first of the appropriate mysteries appears at the window 5 and the Paternoster bead 23 has arrived at the cut-away portion 4 of the front cover 1. Upon recital of the Paternoster the bead 23 is moved clockwise (viewing FIG. 1) by the thumb through one-eleventh of a complete revolution as determined by engagement of the spring-pressed plunger 25 with one of the holes 29 in the track 28, and upon recital of each of the ten Aves, each of the ten beads are successively moved in a similar manner. As the last of the beads 22 is moved, i.e. on completion of one revolution of the bead ring 21, the ratchet tongue 24 situated thereunder rotates the ratchet wheel 17 the engagement of which with the ratchet spokes 15 of the picture wheel 10 moves the latter through one-fifteenth of a revolution as determined by the spring 18 engaging the spokes 15, whereby the next picture or symbolic representation on the picture wheel 10 is displayed through the window 5.

Thus on completion of each decade of the rosary, a pictorial or symbolic representation of the mystery appropriate to the next decade is automatically displayed through the window 5. Moreover, it will be apparent that in the event of unavoidable interruption during recital of the rosary, the ring rosary according to the invention will provide a readily identifiable record of the stage reached when the interruption occurred and from which the recital of the rosary may be continued.

In an alternative embodiment of the invention, illustrated in FIGS. 13–17, the assembly according to FIGS. 1 to 12 is modified to the extent that instead of having the ratchet spokes 15 projecting from the underneath boss portion 14 of the picture wheel 10, a separate ratchet spoke disc 30 is provided, and the ratchet wheel 17 and U-spring 18 with its anchor pins 19 are mounted upon the inside of the back cover 26, these modifications in the assembly rendering the ratchet carrier ring 16 of FIGS. 1–12 unnecessary and permitting an advantageous reduction in the overall depth of the assembled ring rosary.

In FIGS. 13–17, parts similar to those employed in the embodiment of FIGS. 1–12 are designated with the same reference numerals as in FIGS. 1 to 12, and since the function and operation of these similar parts in the embodiment of FIGS. 13–17 is the same as in the embodiment of FIGS. 1–12, no further description of these parts appears herein.

In the front circular cover 1 of the present embodiment (see FIGS. 13 and 17) the recess 6 and the stepped recess 9 of the previous embodiment are not required, and stub spindle 7 is replaced by a boss 7a forming a bearing surface for the picture wheel 10 which is rotatably housed in the stepped recess 8 of the cover 1.

The front surface of the picture wheel 10 (see FIGS. 13, 14 and 17) is the same as that in the embodiment of FIGS. 1–12, the rear surface being provided with a central stub spindle 13a, and for correct registration with the ratchet spoke disc 30 the disc 10 is provided with a pair of spaced apart holes 34 therein.

The bead ring 21 which is the same as that of FIGS. 1–12, is rotatably supported in an annular peripheral track 28 formed in the inner front surface of the back cover 26.

The ratchet spoke disc 30 (see FIGS. 13, 15 and 17) is provided on its front face with the required fifteen upstanding peripheral spokes 15, said front face having an upstanding central boss 31 provided with an axial hole 32 extending through the boss 31 and the disc 30. The boss 31 is formed with a pair of upstanding locating pins 33 for engagement in the holes 34 of the picture wheel 10, whereby correct relative dispositioning of the disc 30 and picture wheel 10 is attained and the intermittent rotation of the disc 30, effected by the engagement of the ratchet wheel 17 with the spokes 15, is transmitted to the picture wheel 10. As will be apparent from FIG. 17, the disc 30 is rotatably mounted on an upstanding central stub axle 35 formed on the front face of the back cover 26, the disc 30 being housed in a central recess 36 of the back cover 26. The stub axle 13a of the picture wheel 10 projects into the central hole 32 of the boss 31 of the ratchet spoke disc 30.

Figure 13:
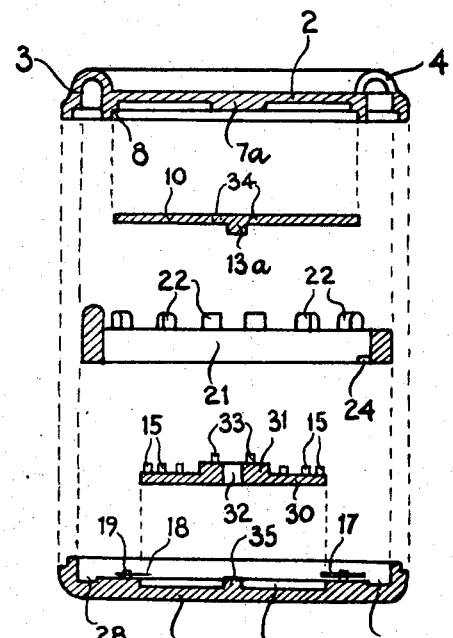
FIG. 13 is an expanded assembly view in central cross-section of the components in an alternative modified embodiment.
Figure 16:
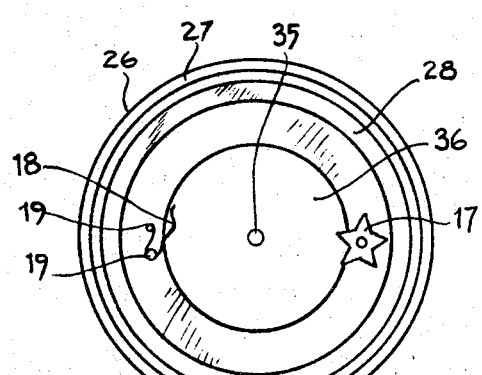
FIG. 16 is a plan view of the inner face of the back closure.
Figure 17:
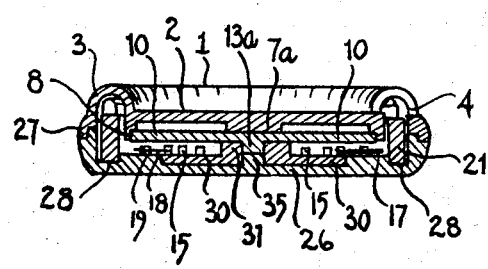
FIG. 17 is a central cross-sectional view of the assembly.

As shown in FIGS. 13, 16 and 17, the ratchet wheel 17 and the U-spring 18 with its anchor pins 19 are mounted on the front face of the back cover 26 between the recesses 28 and 36 so that they are disposed at the same level as that of the spokes 15 with which they co-operate. The back cover 26 has a recessed peripheral edge 27 for snap-on engagement with the interior of the outer limb of the front cover 1 as in the previous embodiment, and both the front and back covers are preferably provided with markings the aligning of which prior to snap-on engagement ensures correct relative positioning of the ratchet wheel 17 on the back cover 26 with the cut-away portion 4 of the front cover 1.

As the operation of the assembly according to the present embodiment is the same as that of the previous embodiment, no further description of the said operation is deemed necessary.

It is to be understood that the invention is not confined in its scope to the particular constructional details herein described with reference to the accompanying drawings. Thus, it will be appreciated that a second window could be provided in the front cover 1, or in the back cover 26 at a radial distance from the centre thereof less than that of the window 5, the picture wheel 10 having a set of symbolic representations of the mysteries thereon adapted to be automatically and successively displayed through the second window while pictorial representations are displayed through the first window.

It will, moreover, be understood that while in the embodiment described some of the components are made of thermoplastic material and other components are made of metal, all the components may be made in any alternative suitable material.

What I claim is:

1. A count indicator particularly for indicating the number of prayers said in the recitation of a rosary comprising a casing, said casing comprising a base member and a cover member arranged to fit over and interengage said base member, said cover member having an annular housing positioned at its outer periphery encircling a disk-like member forming the center portion of said cover member, said annular housing projecting upwardly from said disk-like member and combining with said base member to form a ring shaped passageway, the face of said base member within said casing having an annular track aligned below said annular housing, a bead ring disposed on said track and extending upwardly into said ring shaped passageway whereby it is slidable on said track and is movably positionable through said passageway, a plurality of uniformly angularly spaced protuberances on the upper face of said bead ring extending into the upper half of said ring passageway, a portion of the upper half of said annular housing cut away whereby at least one of said protuberances is accessible from the exterior of said cover for affording manual movement of the bead ring through said passageway, a projection extending inwardly from the inner face of said bead ring, a movable picture wheel disposed inwardly from said bead ring and mounted in said casing, said picture wheel having an upper surface divided into a number of similar radially extending sections, a transparent portion on said disk member arranged to register with one of said radial sections whereby the sections can be viewed from the exterior of said cover, a movable part mounted within said casing and arranged to be engaged by said projection on said bead ring, means on said picture wheel in engagement with said movable part, holding means mounted within said casing and spaced from said movable part for affording an interengagement with said means on said picture wheel, whereby each time said bead ring is manually moved through one complete revolution, said projection on said bead ring interengages said movable part and said movable part in engagement with said means on said picture wheel rotates said picture wheel a fraction of a complete revolution and said interengaging holding means acts as a resilient stop member limiting the rotational movement of said picture wheel.

2. A count indicator as set forth in claim 1, wherein said cover member interengages said base member at the peripheral edge thereof, said annular housing having a U-shaped radial cross section with the opening in the U-shaped section facing downwardly toward said base member, eleven of said uniformly angularly spaced protuberances disposed on the upper face of said bead ring, said projection comprising a ratchet tongue, said picture wheel having fifteen of said radially extending sections, said means on said picture wheel comprising fifteen uniformly angularly spaced spokes projecting from said picture wheel and each corresponding to one of said sections on the upper face of said picture wheel, said movable part comprising a rotatable ratchet wheel whereby each time said bead ring is manually moved through one complete revolution, said ratchet tongue on said bead ring interengages said ratchet wheel and said ratchet wheel is rotated and in turn rotates said picture wheel one/fifteenth of a complete revolution and said interengaging locking means acts as a resilient stop member limiting the rotational movement of said picture wheel.

3. A count indicator as set forth in claim 2, wherein a stub spindle is located in the center of and extends downwardly from said disk-like member within said casing, said picture wheel has a central opening therein and is movably fitted onto said stub spindle of said disk-like member, a plunger is mounted in said bead ring and is spring biased to extend downwardly from the face thereof riding on said track, eleven holes disposed in said track in substantially the same spacing as said protuberances on said bead ring and arranged in turn to receive said plunger, a central boss portion extending downwardly from the lower face of said picture wheel, said spokes on said picture wheel projecting downwardly from said boss portion, a carrier ring fitted at its inner periphery about said boss on said picture wheel and having a projection from its outer periphery engaged into a recess in said cover whereby said carrier ring is restrained from rotation relative to said cover; said ratchet wheel mounted on the lower face of said carrier ring and extending inwardly therefrom into engagement with one of the spokes on said boss, said locking means comprising a spring member secured on said carrier ring and spaced angularly from said ratchet wheel, whereby as said picture wheel is rotated by said ratchet wheel in engagement with one of the spokes on said boss, said spring member prevents the picture wheel from rotating more than one spoke position.

4. A count indicator as set forth in claim 2, wherein said picture wheel comprises an upper disk and a lower ratchet spoke disk, said upper disk having a stub spindle extending downwardly from its lower face, said ratchet spoke disk having an axially positioned hole for receiving said stub spindle, means for interengaging said spoke disk and upper disk whereby they rotate as a unit, a stub axle extending upwardly from the inner face of said base member in said casing and arranged to fit within the axially positioned hole of said spoke disk opposite the upper disk, said fifteen spokes mounted on the upper face of said spoke disk, said ratchet wheel mounted on the inner face of said base member and disposed outwardly from said spoke disk, said locking means comprising a spring member secured to the inner face of said base member diametrically opposite said ratchet wheel for engagement with one of the spokes on said disk member, whereby as the ratchet tongue on said bead ring rotates said ratchet wheel, the ratchet wheel moves the picture wheel by means of the spokes on said lower ratchet spoke disk through one/fifteenth of a revolution and said spring member interlocks with another of said spokes for preventing any greater movement than the one/fifteenth revolution.

References Cited

UNITED STATES PATENTS

| | | | |
|---|---|---|---|
| 1,324,524 | 12/1919 | Silver | 35—23.5 |
| 1,938,727 | 12/1933 | Tammany | 35—23.5 |
| 2,187,664 | 1/1940 | Rogus | 35—23.5 |
| 2,461,130 | 2/1949 | Szaj | 35—23.5 |
| 2,666,581 | 1/1954 | Smith | 35—23.5 |
| 2,717,737 | 9/1955 | Hoelscher | 235—123 |
| 2,730,816 | 1/1956 | Garrett | 35—23.5 |

RICHARD B. WILKINSON, *Primary Examiner.*

STANLEY A. WAL, *Assistant Examiner.*